United States Patent
Zhang et al.

(10) Patent No.: US 9,078,232 B2
(45) Date of Patent: Jul. 7, 2015

(54) METHODS AND APPARATUSES FOR CHARACTERIZING AND AFFECTING MOBILE DEVICE LOCATION ACCURACY AND/OR UNCERTAINTY

(71) Applicant: QUALCOMM Incorporated, San Diego, CA (US)

(72) Inventors: Gengsheng Zhang, Cupertino, CA (US); Ferit O. Akgul, San Jose, CA (US); Sundar Raman, Fremont, CA (US); Murthy S. Vempati, San Jose, CA (US); Gaurav Lamba, Los Altos, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 153 days.

(21) Appl. No.: 13/958,312

(22) Filed: Aug. 2, 2013

(65) Prior Publication Data

US 2014/0329538 A1 Nov. 6, 2014

Related U.S. Application Data

(60) Provisional application No. 61/817,947, filed on May 1, 2013.

(51) Int. Cl.
*H04W 24/00* (2009.01)
*H04W 64/00* (2009.01)
*G01S 5/02* (2010.01)

(52) U.S. Cl.
CPC ............. *H04W 64/003* (2013.01); *G01S 5/021* (2013.01)

(58) Field of Classification Search
CPC ..... H04W 64/00; H04W 64/003; H04W 4/02; H04W 52/04; H04W 52/10; H04W 52/12; H04W 52/24; H04W 52/40; H04W 52/50; H04W 52/367

USPC ............. 455/456.1, 456.5, 456.6, 522, 67.11, 455/67.13, 226.1–226.3

See application file for complete search history.

(56) References Cited

U.S. PATENT DOCUMENTS

| | | |
|---|---|---|
| 6,456,956 B1 | 9/2002 | Xiong |
| 7,689,240 B2 | 3/2010 | Anderson |

(Continued)

FOREIGN PATENT DOCUMENTS

WO WO-2010141885 A2 12/2010

OTHER PUBLICATIONS

Zirari, Sou Maya, "Geometric and Signal Strength Dilution of Precision (DoP)", IJCSI International Journal of Computer Science Issues, vol. 3, 2009, ISSN (online) 1694-0784.

(Continued)

*Primary Examiner* — Temica M Beamer
(74) *Attorney, Agent, or Firm* — Berkeley Law & Technology Group, LLP

(57) ABSTRACT

Techniques are provided, which may be implemented via various methods, apparatuses, and/or articles of manufacture. For example, an electronic device may obtain an estimated location of a mobile device, determine a quality of a geometric distribution of transmitting devices capable of transmitting wireless signals to the mobile device at the estimated location, and assign an uncertainty to the estimated location. In certain implementations, an electronic device may further determine an adapted transmission setting for a transmitting device and transmit a corresponding message to the transmitting device. In certain implementations, an electronic device may identify adapted assistance data for the mobile device and transmit a corresponding message to one or more other electronic devices.

80 Claims, 6 Drawing Sheets

(56) References Cited

U.S. PATENT DOCUMENTS

| | | |
|---|---|---|
| 8,170,583 B2 | 5/2012 | Shkedi |
| 2004/0077355 A1 | 4/2004 | Krenik et al. |
| 2004/0160909 A1 | 8/2004 | Sheynblat |
| 2004/0219931 A1 * | 11/2004 | Bi et al. .................... 455/456.1 |
| 2005/0148340 A1 | 7/2005 | Guyot |
| 2009/0022170 A1 | 1/2009 | Mehta et al. |
| 2009/0061779 A1 | 3/2009 | Gurney et al. |
| 2011/0090122 A1 | 4/2011 | Thomson et al. |

OTHER PUBLICATIONS

International Search Report and Written Opinion—PCT/US2014/036038—ISA/EPO—Aug. 21, 2014.

* cited by examiner

METHODS AND APPARATUSES FOR CHARACTERIZING AND AFFECTING MOBILE DEVICE LOCATION ACCURACY AND/OR UNCERTAINTY

This patent application claims benefit of and priority to U.S. Provisional Patent Application 61/817,947, filed May 1, 2013, entitled, "METHOD AND/OR SYSTEM FOR ASSESSING AND ADAPTING TO DEVICE POSITION UNCERTAINTY", and which is assigned to the assignee hereof and incorporated herein by reference.

BACKGROUND

1. Field

The subject matter disclosed herein relates to electronic devices, and more particularly to methods, apparatuses and articles of manufacture for use by one or more electronic devices in characterizing an estimated location of a mobile device, and attempting to affect an accuracy of, and/or an uncertainty corresponding to, a subsequent estimated location of the mobile device that is determined based, at least in part, on one or more wireless signals received by the mobile device from one or more terrestrial-based transmitting devices.

2. Information

As its name implies, a mobile device may be moved about, e.g. typically being carried by a user and/or possibly a machine. By way of some non-limiting examples, a mobile device may take the form of a cellular telephone, a smart phone, a tablet computer, a laptop computer, a wearable computer, a navigation and/or tracking device, etc.

A position and/or movements of a mobile device may be determined, at least in part, by a positioning and/or navigation capability (herein after simply referred to as a positioning capability) that may be implemented on board the mobile device, in one or more other electronic devices, and/or some combination thereof. Certain positioning capabilities may be based on one or more wireless signals transmitted by one or more transmitting devices and acquired by mobile device. By way of example, certain wireless signal-based positioning capabilities make use of wireless signals acquired from a satellite positioning system (SPS), such as, e.g., the global positioning system (GPS), etc.

In another example, certain wireless signal-based positioning capabilities make use of wireless signals acquired from terrestrial-based wireless transmitting devices, such as, e.g., a dedicated positioning Beacon transmitting device, an access point (AP) device which may be part of a wireless local area network, a base transceiver station which may be part of the cellular telephone system, and/or the like or some combination thereof. In certain implementations, a positioning capability may make use of one or more electronic files, such as, e.g., an electronic map, a routability graph, a radio heatmap, and/or the like or some combination thereof, to determine a position and/or other movements of the mobile device within a particular environment.

SUMMARY

In accordance with certain aspects, a method may be implemented with a computing platform. The method may comprise: obtaining an estimated location of a mobile device; determining a quality of a geometric distribution of a plurality of transmitting devices capable of transmitting wireless signals to the mobile device at the estimated location; assigning an uncertainty to the estimated location based, at least in part, on the quality of the geometric distribution; in response to the uncertainty being less than a threshold uncertainty, determining an adapted transmission setting for at least one of the plurality of transmitting devices; and transmitting a message to the at least one of the plurality of transmitting devices indicating the adapted transmission setting.

In accordance with certain aspects, an apparatus may be provided which comprises: means for obtaining an estimated location of a mobile device; means for determining a quality of a geometric distribution of a plurality of transmitting devices capable of transmitting wireless signals to the mobile device at the estimated location; means for assigning an uncertainty to the estimated location based, at least in part, on the quality of the geometric distribution; means for determining an adapted transmission setting for at least one of the plurality of transmitting devices, in response to the uncertainty being less than a threshold uncertainty; and means for transmitting a message to the at least one of the plurality of transmitting devices indicating the adapted transmission setting.

In accordance with certain aspects, a device may be provided which comprises: a communication interface; and a processing unit coupled to the communication interface and configured to: obtain an estimated location of a mobile device; determine a quality of a geometric distribution of a plurality of transmitting devices capable of transmitting wireless signals to the mobile device at the estimated location; assign an uncertainty to the estimated location based, at least in part, on the quality of the geometric distribution; determine an adapted transmission setting for at least one of the plurality of transmitting devices, in response to the uncertainty being less than a threshold uncertainty; and initiate transmission of a message, via the communication interface, to the at least one of the plurality of transmitting devices indicating the adapted transmission setting.

In accordance with certain aspects, an article of manufacture may be provided which comprises a non-transitory computer readable medium having stored therein computer implementable instructions executable by a processing unit of a computing platform to: obtain an estimated location of a mobile device; determine a quality of a geometric distribution of a plurality of transmitting devices capable of transmitting wireless signals to the mobile device at the estimated location; assign an uncertainty to the estimated location based, at least in part, on the quality of the geometric distribution; determine an adapted transmission setting for at least one of the plurality of transmitting devices, in response to the uncertainty being less than a threshold uncertainty; and initiate transmission of a message to the at least one of the plurality of transmitting devices indicating the adapted transmission setting.

In accordance with certain aspects, a method may be implemented with a computing platform. The method may comprise: obtaining an estimated location of a mobile device; determining a quality of a geometric distribution of a plurality of transmitting devices capable of transmitting wireless signals to the mobile device at the estimated location; assigning an uncertainty to the estimated location based, at least in part, on the quality of the geometric distribution; identifying adapted assistance data for the mobile device, in response to the uncertainty being less than a threshold uncertainty; and transmitting a message indicative of the adapted assistance data to an electronic device.

In accordance with certain aspects, an apparatus may be provided which comprises: means for obtaining an estimated location of a mobile device; means for determining a quality of a geometric distribution of a plurality of transmitting devices capable of transmitting wireless signals to the mobile device at the estimated location; means for assigning an uncertainty to the estimated location based, at least in part, on the quality of the geometric distribution; means for identifying adapted assistance data for the mobile device, in response to the uncertainty being less than a threshold uncertainty; and means for transmitting a message indicative of the adapted assistance data to an electronic device.

In accordance with certain aspects, a device may be provided which comprises: a communication interface; and a processing unit coupled to the communication interface and configured to: obtain an estimated location of a mobile device; determine a quality of a geometric distribution of a plurality of transmitting devices capable of transmitting wireless signals to the mobile device at the estimated location; assign an uncertainty to the estimated location based, at least in part, on the quality of the geometric distribution; identify adapted assistance data for the mobile device, in response to the uncertainty being less than a threshold uncertainty; and initiate transmission of a message indicative of the adapted assistance data to an electronic device via the communication interface.

In accordance with certain aspects, an article of manufacture may be provided which comprises a non-transitory computer readable medium having stored therein computer implementable instructions executable by a processing unit of a computing platform to: obtain an estimated location of a mobile device; determine a quality of a geometric distribution of a plurality of transmitting devices capable of transmitting wireless signals to the mobile device at the estimated location; assign an uncertainty to the estimated location based, at least in part, on the quality of the geometric distribution; identify adapted assistance data for the mobile device, in response to the uncertainty being less than a threshold uncertainty; and initiate transmission of a message indicative of the adapted assistance data to an electronic device.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
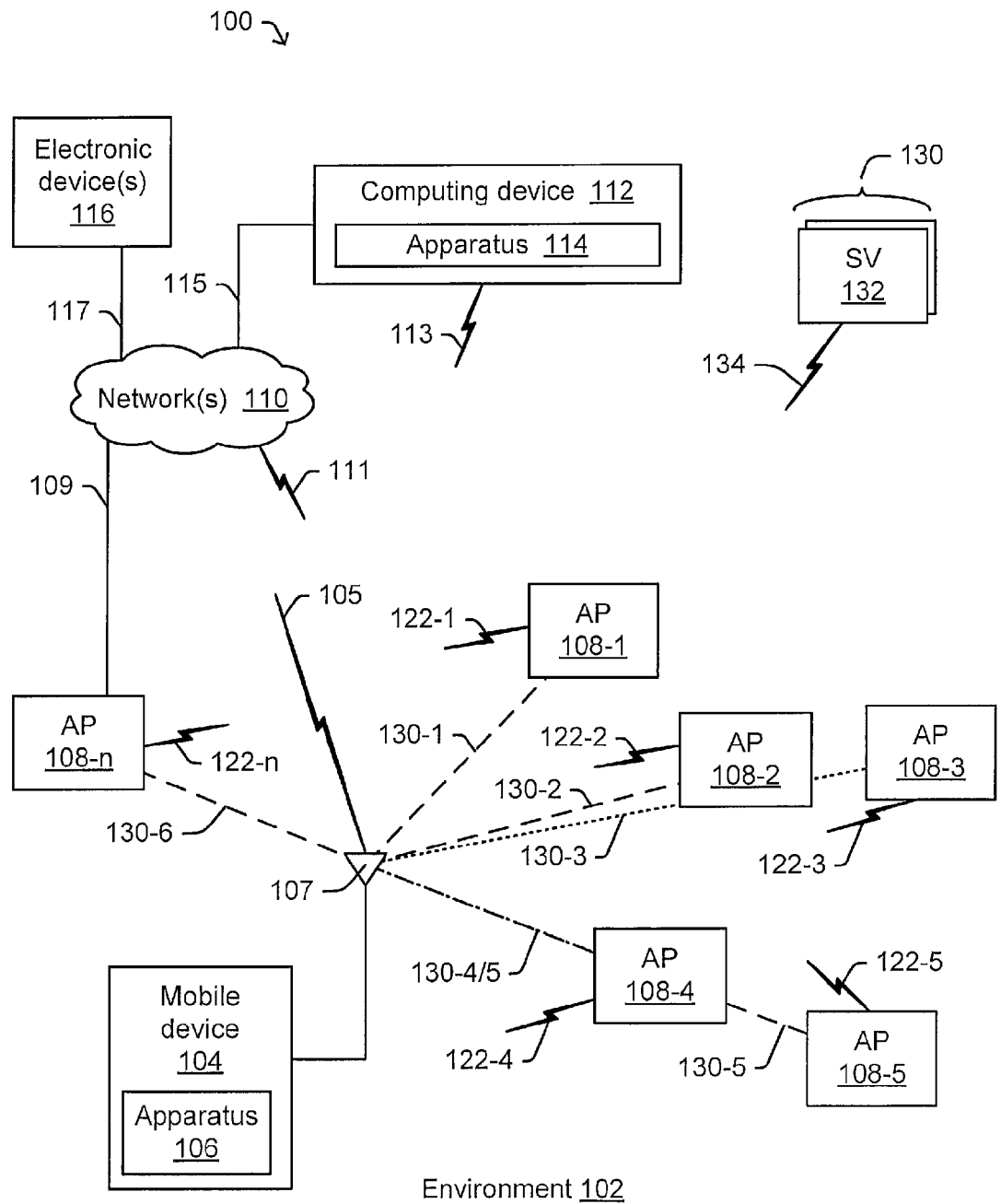
FIG. 1 is a schematic block diagram illustrating an arrangement of representative electronic devices including one or more electronic devices for use in characterizing an estimated location of a mobile device, and attempting to affect an accuracy of, and/or an uncertainty corresponding to, a subsequent estimated location of the mobile device, in accordance with an example implementation.

Various techniques are described herein which may be implemented using one or more electronic devices to characterize an initial estimated location of a mobile device that is determined based, at least in part, on one or more wireless signals received by the mobile device from one or more terrestrial-based transmitting devices. The techniques provided a feedback mechanism through which an attempt may be initiated to affect an accuracy of, and/or an uncertainty corresponding to, a subsequent estimated location of the mobile device.

By way of one example, an apparatus may be provided (e.g., in a mobile device, in a network-based computing device, etc.) that is capable of characterizing an uncertainty corresponding to an initial estimated location of the mobile device. In certain instances, such an uncertainty corresponding to an estimated location may be based, at least in part, on a measure of quality of a geometric distribution of a plurality of terrestrial-based transmitting devices capable of transmitting wireless signals to the mobile device while it's located at or near a particular location (e.g., the estimated location). For example, in certain implementations a geometric distribution of a plurality of terrestrial-based transmitting devices may be based, at least in part, on a calculated dilution of precision (DOP) and/or the like corresponding to at least a portion of the plurality of terrestrial-based transmitting devices.

In an attempt to possibly affect (e.g., improve) the accuracy of a subsequently estimated position of the mobile device, and/or possibly affect (e.g., reduce) a subsequent uncertainty corresponding thereto, such an apparatus may initiate direct or indirect transmission of one or more feedback and/or other like messages (e.g., via one or more wireless signals) to one or more electronic devices. Here, for example, a feedback message may be indicative of one or more operative directives that may be applied by one or more electronic devices in a manner likely to affect an accuracy of a subsequently estimated location of the mobile device, and/or a subsequently characterized uncertainty corresponding to the subsequently estimated location. Hence, in certain instances an operative directive provided via a feedback message may adapt one or more electronic devices involved in a terrestrial signal-based positioning system in a manner which may improve location estimation of a mobile device By way of an example, in certain implementations an operative directive which is indicative of an adapted transmission setting may be provided via one or more feedback messages to a particular one of the plurality of terrestrial-based transmitting devices. The particular transmitting device may apply the adapted transmission setting to affect the transmission of one or more subsequently transmitted wireless signals. For example, in certain instances an adapted transmission setting may be indicative of a desired transmit power setting, e.g., which may be applied to one or more subsequently transmitted wireless signals. Thus, subsequently transmitted wireless signal(s) may have a relatively higher signal strength (or possibly lower signal strength) than previously transmitted wireless signal(s). Similarly, in certain instances, an adapted transmission setting may be indicative of some other controllable aspect(s) of the terrestrial-based transmitting device. For example, in certain instances an adapted transmission setting may be indicative of a frequency setting (e.g., a desired frequency band, a desired center frequency, etc.). In certain instances, an adapted transmission setting may be indicative of a channel setting (e.g., specifying one or more channel(s) which may improve reception at the mobile device, etc.). In certain instances, an adapted transmission setting may be indicative of a transmission mode setting (e.g., specifying a particular wireless communication protocol, a particular coding scheme, etc.). Those skilled in the art will recognize that other controllable aspects may be affected via an adapted transmission setting, and that claimed subject matter is not necessarily limited to just these few examples.

In accordance with certain aspects, an operative directive may be indicative of certain adapted assistance data (e.g., specifying and/or comprising particular electronic map information, particular wireless signal heatmap information, etc.) that may be of particular use by the mobile device for positioning and/or other like capabilities. For example, in certain instances all or part of the assistance data for a particular environment may be subdivided into a tiered set of assistance data, e.g., wherein successive tiers of assistance data may represent more precise and/or otherwise enhanced/detailed information. Thus, for example, in an attempt to possibly improve the accuracy of a subsequently estimated position of the mobile device, and/or possibly reduce a subsequent uncertainty corresponding thereto, and operative directive may be indicative of adapted assistance data comprising one or more different/additional tiers and/or one or more other portions/types of assistance data.

In certain instances, adapted assistance data may be based, at least in part, on one or more other operative directives that may affect subsequently transmitted wireless signals within an environment (e.g., should an adapted transmission setting the applied, etc.). Accordingly, in certain instances, all or part of certain adapted assistance data may be predetermined, while in other instances, all or part of certain adapted assistance data may be dynamically modeled and/or otherwise generated in some manner, e.g., to correspond to a particular environment.

In certain example implementations, an operative directive within a feedback message transmitted to the mobile device may comprise all or part of the adapted assistance data.

In certain example implementations, an operative directive within a feedback message transmitted to an electronic device (e.g., which is not the mobile device) may be indicative of a request to such an electronic device for all or part of the adapted assistance data. Hence, in response to such a request, an electronic device may transmit at least a portion of the requested adapted assistance data to the mobile device.

Attention is now drawn to FIG. 1, which is a schematic block diagram illustrating an example arrangement 100 comprising various example electronic devices, one or more of which may be configured for use in characterizing an estimated location of a mobile device 104, and attempting to affect an accuracy of, and/or an uncertainty corresponding to, a subsequent estimated location of the mobile device 104, and/or possibly other nearby mobile device(s).

Mobile device 104 is shown as being located within a particular environment 102. As described in greater detail herein, in certain instances particular environment 102 may comprise an indoor environment, e.g., in which satellite positioning system (SPS) signals may be unreliable or unavailable at times due to various interfering structures, objects, etc.

In particular environment 102, it may be possible for mobile device 104 to perform signal-based positioning based on other (e.g., non-SPS) wireless signals transmitted by one or more terrestrial-based transmitting devices, which are represented within arrangement 100 using a plurality of access point (AP) devices identified as AP 108-1, AP 108-2, AP 108-3, AP 108-4, AP 108-5, . . . , AP 108-n. Such representative transmitting devices may be provisioned at known or determinable locations that may allow mobile device 104 to support and/or perform signal-based positioning based on one or more signals received therefrom and/or exchanged therewith.

In certain example implementations, one or more of these representative transmitting devices (AP 108-1 through AP108-n) may indeed represent a wireless local area network (WLAN) and/or other like service access device. Thus, for example, in certain instances AP 108-n may represents a wireless router device which may be coupled to one or more network(s) 110 via one or more wired and/or wireless communication links 109. In certain instances network(s) 110 may comprise the Internet, etc., and hence mobile device 104 may access various electronic devices 116 (e.g., servers, etc.) via network(s) 110 and applicable wired and/or wireless communication links (e.g., 105 122-in 109, 117). Hence, in addition to supporting and/or performing signal-based positioning, mobile device 104 transmit and/or receive various types of data communicate with one or more electronic devices, e.g., via AP 108-n, etc.

By way of further example, in certain example implementations one or more of these representative transmitting devices may comprise a cellular base transceiver station, a femtocell device, a picocell device, a cellular repeater device, and/or the like which may be terrestrially provisioned to provide coverage within all or part of environment 102, e.g., from a known or determinable location that may allow mobile device 104 to support and/or perform signal-based positioning. In certain example implementations, one or more of these representative transmitting devices may comprise a dedicated location Beacon transmitting device (e.g., provisioned as part of a location based service and/or the like within all or part of environment 102), e.g., having a known or determinable estimated location that may allow mobile device 104 to support and/or perform signal-based positioning based at least in part on one or more signals received therefrom. In certain example implementations one or more of these representative transmitting devices may comprise another mobile device having a known or determinable estimated location that may allow mobile device 104 to support and/or perform signal-based positioning based on one or more signals received therefrom and/or exchanged therewith. In certain example implementations one or more of these representative transmitting devices may comprise a peripheral electronic device and/or some other form of an electronic device/machinery having a known or determinable estimated location that may allow mobile device 104 to support and/or perform signal-based positioning based on one or more signals received therefrom and/or exchanged therewith.

Accordingly, it should also be understood that mobile device 104 may receive and/or transmit one or more wireless signals with one or more of representative transmitting devices (AP 108-1 through AP108-*n*) in support of a signal-based positioning capability. For example, an RSSI and/or the like may be determined based, at least in part, on one or more wireless signals received from one or more transmitting devices. For example, an RTT and/or the like may be determined based, at least in part, on an exchange of wireless signals between mobile device 104 and one of the transmitting devices. As various example signal-based positioning capabilities and others are well known, specific details are not presented in the present description.

In FIG. 1, mobile device 104 is representative of any electronic device capable of being moved in some manner at least within environment 102. Hence, by way of example, mobile device 104 may comprise a cellular telephone, a smart phone, a tablet computer, a laptop computer, a wearable computer, a navigation and/or tracking device, etc. As illustrated, mobile device 104 may comprise an apparatus 106, which may be configured to provide and/or support in some manner one or more of the techniques provided herein. In certain instances, apparatus 106 may comprise hardware/firmware components, or possibly a combination of hardware/firmware and software components. A representative antenna 107 is illustrated for mobile device 104 as being external to mobile device 104 and located at an estimated position within environment 102. It should be understood however, that in certain instances, mobile device 104 may comprise one or more antennas, some or all of which may be provisioned internal to mobile device 104.

A communication link 105 illustrated as extending from antenna 107 represents unidirectional and/or bidirectional wireless signaling may be supported. Other communication links are also illustrated in FIG. 1, representing unidirectional and/or bidirectional wireless signaling, as may be applicable for individual representative transmitting devices. More specifically, a communication link 122-1 corresponds to AP 108-1, a communication link 122-2 corresponds to AP 108-2, a communication link 122-3 corresponds to AP 108-3, a communication link 122-4 corresponds to AP 108-4, a communication link 122-5 corresponds to AP 108-5, and a communication link 122-*n* corresponds to AP 108-*n*. A communication link 113 is illustrated as representing possible unidirectional and/or bidirectional wireless signaling corresponding to computing device 112. Also, a communication link 111 is illustrated as representing possible unidirectional and/or bidirectional wireless signaling corresponding to one or more devices, services, etc., of network(s) 110. With these various representative communication links, it should be understood that mobile device 104 may receive and/or transmit one or more wireless signals with AP 108-1 via communication link 105 and/or communication link 122-1, which may be combined to represent a single communication link between these two example electronic devices. As a further example, it should be understood that computing device 112 may directly receive and/or directly transmit one or more wireless signals with AP 108-4 via communication link 113 and/or communication link 122-4, which may be combined to represent a single communication link between these two example electronic devices. Furthermore it should be understood that, in certain instances, computing device 112 may indirectly communicate with AP 108-3, e.g., via communication link 115, network(s) 110, and one or both of communication links 111 and 122-3. In yet another example, computing device 112 may communicate with one or more electronic devices 116 via some combination of representative communication links 115, 113, 111, 117, and network(s) 110; and/or one or more electronic devices 116 may communicate with mobile device 104 via some combination of representative communication links 117, 111, 105, and/or possibly 109 and 122-*n*, just to name a few examples.

Note that for the sake of brevity, only AP 108-*n* is illustrated as having a second communication link 109, but that in certain example implementations one or more of the other representative transmitting devices may have additional wired and/or wireless communication links to support additional bidirectional and/or unidirectional signaling. For example, in certain instances (although not shown in FIG. 1) AP 108-1 may be coupled to network(s) 110 via one or more wired and/or wireless communication links.

Although certain communication links are illustrated in FIG. 1 as being either wireless communication links or wired communication links, it should be kept in mind that some communication links may comprise wired and/or wireless communication links, and/or even other intervening and/or supporting devices, etc.

Computing device 112, which may be located within, nearby, or remotely from environment 102, may comprise an apparatus 114, which may be configured to provide and/or support in some manner one or more of the techniques provided herein. In certain instances, apparatus 114 may comprise hardware/firmware components, or possibly a combination of hardware/firmware and software components.

Network(s) 110 is intended to represent all or part of one or more other electronic devices and/or communication facilities and/or resources capable of supporting wired and/or wireless electronic communication. Thus for example, network(s) 110 may comprise all or part of a telephone network, a cellular telephone network, a wireless communication network, an intranet, the Internet, and/or the like or some combination thereof.

Although communication link 115 between network(s) 110 and computing device 112 are illustrated here as representing "wired" communication links it should be understood that in certain instances these communication links may represent one or more wired and/or wireless communication links. Indeed, in this example, communication links 111 and/or 113 may be representative of a wireless communication link represented by communication link 115. Furthermore, it should be understood that a "wired" communication link may comprise electrically conductive wires, cables, etc., and/or similar light or other wavelength conductive members, e.g., fiber-optic cables, waveguides, etc.

As further illustrated, in certain implementations arrangement 100 may comprise one or more space positioning systems (SPS) 130, which may transmit applicable wireless signals that may, at times, be acquired by mobile device 104 and used, at least in part, to support a positioning function under certain conditions. Here, for example, SPS 130 may comprise a plurality of space vehicles (SVs) 132, each of which may transmit one or more SPS signals 134.

Further illustrated in FIG. 1, are directional lines intended to represent the different angles between antenna 107 of mobile device 104 (e.g., at some location within environment 102) and each of the representative transmitting devices (AP 108-1 through AP 108-*n*) as provisioned at some known or determinable location which may or may not be within environment 102. More specifically, a directional line 130-1 is drawn between antenna 107 and AP 108-1, a directional line 130-2 is drawn between antenna 107 and AP 108-2, and a directional line 130-3 is drawn between antenna 107 and AP 108-3. Since, and this example, AP 108-4 and AP 108-5 are aligned with antenna 107, a combined directional line 130-4/5 is drawn between antenna 107 and AP 108-4, and antenna 107 and AP 108-5 are drawn connected using the combined directional line 130-4/5 and a single directional line 130-5. Finally, in this example, a directional line **130-*n* is drawn between antenna 107 and AP 108-*n***.

As may be appreciated, in certain instances, it may be preferable to determine an estimated position of mobile device 104 using wireless signals received from transmitting devices having a higher quality of geometric distribution. Thus, for example, an estimated position of mobile device 104 may be obtained using wireless signals from AP 108-1, AP 108-4 and AP 108-5, however sense AP 108-4 and AP 108-5 essentially fall along the same directional line from antenna 107, the resulting estimated position may have a low-level of accuracy and/or a high-level of uncertainty due, at least in part, to an apparent lower quality of geometric distribution. Likewise, an estimated position of mobile device 104 may be obtained using wireless signals from AP 108-1, AP 108-2 and AP 108-3, however sense AP 108-2 and AP 108-3 fall along only slightly different directional lines from antenna 107, the resulting estimated position may have a low-level of accuracy and/or high-level of uncertainty due, at least in part, to a relatively better but still lower quality of geometric distribution. To the contrary, an estimated position of mobile device 104 obtained using wireless signals from AP 108-1, AP 108-3, AP 108-5 may have a somewhat higher level of accuracy and/or lower level of uncertainty, do, at least in part, to a relatively higher quality of geometric distribution. Even better, in certain instances, an estimated position of mobile device 104 obtained using wireless signals from AP 108-1, AP 108-2, AP 108-4, and AP **108-*n***, may have an even higher level of accuracy and/or even lower level of uncertainty two at least in part, to an even higher apparent quality of geometric distribution. As presented herein, in certain instances, a geometric distribution of a plurality of terrestrial-based transmitting devices may be based, at least in part, on a calculated DOP, e.g., a horizontal DOP (HDOP) and/or the like. An example HDOP implementation is presented greater detail in subsequent sections.

Those skilled in the art will recognize that other techniques may be implemented to determine a measure of quality of a geometric distribution of a plurality of terrestrial-based transmitting devices capable of transmitting wireless signals to mobile device 104. By way of one example, a convex hull algorithm and/or the like may be applied, at least in part, to determine a measure of quality of a particular geometric distribution.

In certain example implementations, a measure of uncertainty corresponding to an estimated location of a mobile device may correspond to a level of confidence in such an estimated position. For example, a lower uncertainty may be indicative of a higher quality of estimation and vice versa. In certain electronic devices, a metric indicative of a level of uncertainty may be visually presented to a user at an application layer and/or otherwise through a graphical user interface via a display. For example, in certain instances a visual representation of an electronic map may be presented with the estimated location of a mobile device indicated in some manner (e.g., a crosshair marker, an icon, etc.) along with a graphical representation of the metric (e.g., possibly in a form of a circle, cloud, an error scale/legend, a particular color code, particular contrast, a particular translucence, etc.) corresponding to at least part of the indicated estimated location.

In accordance with certain example implementations, once such a metric has been determined, certain resources may be allocated to via various example feedback mechanisms/techniques to possibly affect (e.g., improve) a an accuracy of a subsequently estimated location of the mobile device, and/or a subsequently characterized uncertainty corresponding to the subsequently estimated location. In certain instances, by improving accuracy and/or uncertainty of an estimated location of the mobile device may improve a user experience associated with a positioning capability and/or the like.

As previously mentioned, in certain example implementations, a measure of quality of a geometric distribution of a plurality of terrestrial-based transmitting devices capable of transmitting wireless signals to a mobile device at an estimated location may be determined based, at least in part, on a horizontal dilution of precision (HDOP) analysis, and/or the like. For good geometries, an HDOP metric may be lower while an associated position estimate may have a higher quality. In certain instances, location uncertainty may be quantified via an HDOP calculation. In a particular implementation, HDOP analysis may be applied for obtaining a (possibly user conceivable) measure of uncertainty and/or to initiate a feedback mechanism/process via one or more messages and/or operative directives likely to affect an accuracy of a subsequently estimated location of the mobile device, and/or a subsequently characterized uncertainty corresponding to the subsequently estimated location.

In certain example implementations, a location uncertainty may be obtained based, at least in part, on known or determinable locations of one or more APs (e.g., IEEE std. 802.11 access points, etc.) which may be detectable (e.g., "viewable" or "hearable") at an initial (possibly assumed) estimated location of a mobile device. As mentioned, an uncertainty associated with such an initial estimated location of the mobile device may be computed using any one of several techniques such as, for example, an HDOP that may be computed at mobile device 104 (e.g., using apparatus 106), and/or computing device 112 (e.g., using apparatus 114) (see FIG. 1) using known or determinable locations of viewable/hearable APs and an estimated location of the mobile device.

In certain example implementations, a mobile device may determine locations of viewable/hearable APs from assistance data which may be received from one or more other electronic devices.

By way of a particular non-limiting example, in certain instances HDOP and/or other like measure of quality of a geometric distribution of APs may be classified as "low," "medium" or "high" (e.g., HDOP (h): Qualitative Uncertainty Metric: Quantitative Uncertainty Metric (in meters) $h<=1.5$: low, $1.5<h<=2.5$: medium, $5\ h>2.5$: high). Once location uncertainty is quantified as a metric, the metric may, for example, 1) be relayed back to computing device 112 (e.g., via one or more feedback messages if determined by mobile device 104), 2) be used directly at computing device 112 (if determined by computing device 102), e.g., an attempt to possibly improve or otherwise affect location estimation performance. In one aspect, such location estimation performance may be improved by instructing certain IEEE std. 802.11 APs and/or the like via one or more operative directives to transmit at certain (e.g. possibly higher) transmission power levels (e.g., so that mobile device 104 may have that are signal reception and/or possibly identify additional APs). In another aspect, such location estimation performance may be affected (e.g. possibly improved) by providing mobile device 104 with (possibly more accurate and/or useful) suggested assistance data. For example, some suggested assistance data may be generated/stored at computing device 112 and/or one or more electronic devices 116, which may be capable of transmitting such suggested assistance data to mobile device 104, e.g., possibly in to a request for such. As previously mentioned, in certain instances, all or part of some suggested assistance data may be tiered in some manner (e.g., best quality, medium quality and low quality tiers). As may be appreciated, in certain examples an amount of suggested assistance data may vary depending upon its quality and/or tier-level.

By way of example, in certain instances, an HDOP may be calculated for an estimated location (X, Y, 0) of a mobile device with regard to N transmitting devices as follows:

With the transmitting devices having known locations:
$(X_i, Y_i, Z_i)$ i=1, 2, . . . , N
The HDOP may be calculated as follows.

$$LOS_i = \begin{bmatrix} \frac{X_i - X}{\sqrt{(X_i - X)^2 + (Y_i - Y)^2 + Z_i^2}} \\ \frac{Y_i - Y}{\sqrt{(X_i - X)^2 + (Y_i - Y)^2 + Z_i^2}} \\ \frac{Z_i}{\sqrt{(X_i - X)^2 + (Y_i - Y)^2 + Z_i^2}} \end{bmatrix}$$

$$A = \begin{bmatrix} LOS_1 \\ \vdots \\ LOS_N \end{bmatrix}$$

$$Q = (A^T A)^{-1} = \begin{bmatrix} d_x^2 & d_{xy}^2 & d_{xz}^2 \\ d_{yx}^2 & d_y^2 & d_{yz}^2 \\ d_{zx}^2 & d_{zy}^2 & d_z^2 \end{bmatrix}$$

$$HDOP = \sqrt{d_x^2 + d_y^2}$$

Accordingly, an HDOP and/or the like may be determined, at least in part, on the number of transmitting devices and the relative geometry among the transmitting devices and an estimated location of the mobile device.

According to an example embodiment, a metric may indicate "high," "medium" or "low" HDOP according to Table I as follows:

TABLE 1

| HDOP(h) | Qualitative Uncertainty Metric | Quantitative Uncertainty Metric (in meters) |
| --- | --- | --- |
| h ≤ 1.5 | Low | 3 |
| 1.5 < h ≤ 2.5 | Medium | 5 |
| h > 2.5 | High | 10 |

In certain example implementations, mobile device 104 may estimate its location (e.g., obtain a position fix) by measuring ranges to a plurality of APs. Such ranges may be measured, for example, by obtaining a MAC ID address and/or the like from wireless signals received from such transmitting devices and obtaining range measurements to the transmitting devices by measuring one or more characteristics of wireless signals received therefrom, such as, e.g., a received signal strength (RSSI), a round trip time (RTT), an angle of arrival (AOA), and/or the like or some combination thereof.

In certain implementations, mobile device 104 may obtain an indoor position fix by applying characteristics of acquired wireless signals to a radio heatmap, which may indicate expected RSSI and/or RTT signatures at particular locations in an environment 102. In particular implementations, a radio heatmap may associate identities of certain transmitting devices, expected RSSI from wireless signals transmitted by the identified transmitting devices, an expected RTT from the identified transmitting devices, and possibly standard deviations from these expected RSSI or RTT. It should be understood, however, that these are merely examples of values that may be stored in a radio heatmap and/or the like which may be provided via some form of assistance data, and that claimed subject matter is not limited in this respect.

In certain example implementations, mobile device 14 may receive some assistance data for positioning purposes from one or more electronic devices. For example, some assistance data may include one or more radio heatmaps, locations and identities of transmitting devices positioned at known or determinable locations to enable measuring ranges to these transmitting devices based, at least in part, on a measured RSSI and/or RTT, for example. Other assistance data to aid positioning operations may include radio locations and identities of transmitters, routeability graphs, just to name a few examples. Other assistance data received by the mobile device may include, for example, one or more electronic maps of all or part of environment 102, some of which may be rendered and or otherwise presented via a display device and/or possibly other input/output device, e.g., to aid in navigation, etc. In certain instances, all or part of an electronic map may be provided to mobile device 104 while approaching and/or upon entering a particular portion of environment 102. In certain instances, an electronic map may be indicative of various features such as doors, hallways, entry ways, walls, etc., points of interest such as bathrooms, pay phones, room names, stores, etc. By obtaining and possibly displaying such map information, a mobile device may overlay its estimated location and possibly an uncertainty seceded there with for a user to view, and possibly interact with as part of a positioning operation.

In an example implementation, a routeability graph and/or the like may assist mobile device 104 in defining feasible areas for navigation within environment 102, e.g., subject to physical obstructions (e.g., walls) and passage ways (e.g., doorways in walls). Here, by defining feasible areas for navigation, mobile device 104 may apply constraints to aid in the application of filtering measurements for estimating locations and/or motion trajectories according to a motion model (e.g., according to a particle filter and/or Kalman filter). In addition to measurements obtained from the acquisition of wireless signals from various transmitting devices, according to a particular embodiment, mobile device 104 may further apply a motion model to measurements or inferences obtained from inertial sensors (e.g., accelerometers, gyroscopes, magnetometers, etc.) and/or environment sensors (e.g., temperature sensors, microphones, barometric pressure sensors, ambient light sensors, camera imager, etc.) in estimating a location or motion state of mobile device 104.

Figure 2A:
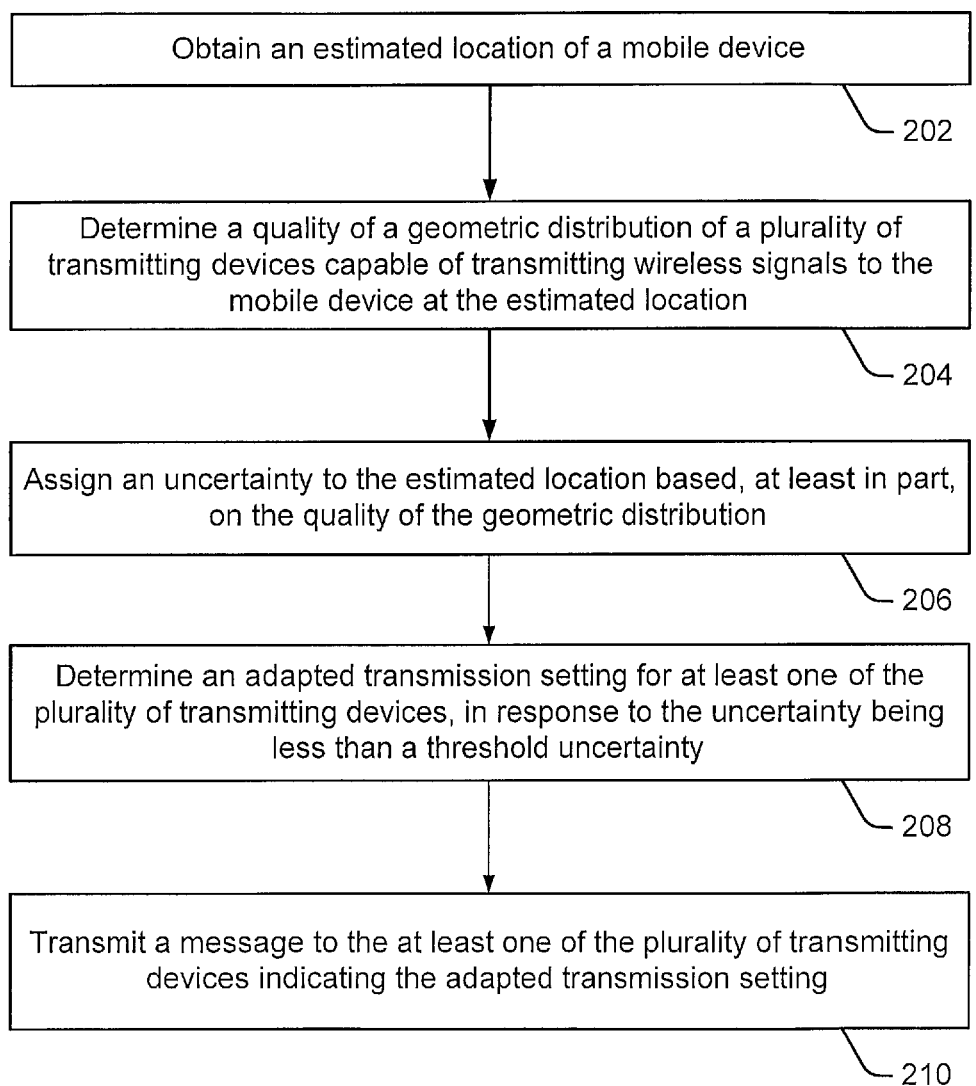
FIG. 2A and FIG. 2B are flow diagrams illustrating some example processes that may be implemented in one or more electronic devices to determine a quality of a geometric distribution of transmitting devices capable of transmitting wireless signals to a mobile device at an estimated location, assign an uncertainty to the estimated location, determine an adapted transmission setting for at least one of the transmitting devices, and transmit a message to the transmitting device indicating the adapted transmission setting, in accordance with certain example implementations.

Attention is drawn next to FIG. 2A, which is a flow diagram illustrating an example process 200 that may be implemented in one or more electronic devices to characterize an estimated location of a mobile device, and attempt to affect an accuracy of, and/or an uncertainty corresponding to, a subsequent estimated location of the mobile device. By way of example, process 200 may be implemented in whole or in part by mobile device 104 and/or apparatus 106 provisioned therein. By way of example, process 200 may be implemented in whole or in part by computing device 112 and/or apparatus 114 provisioned therein.

At example block 202, an estimated location of mobile device 104 (FIG. 1) may be obtained. By way of example, all or part of an estimated location of mobile device 104 may be indicative of a latitude and a longitude, or possibly one or more other indicative parameters corresponding to one or more other coordinate systems, e.g., which may correspond to different positions within environment 102. In certain implementations, all or part of an estimated location of mobile device 104 may be indicative of one or more estimated distances (e.g., pseudoranges) and/or corresponding wireless signal propagation times between mobile device 104 and one or more SVs 132 and/or terrestrial-based transmitting devices (e.g., APs 108-1 through 108-*n*). In certain implementations, all or part of an estimated location of mobile device 102 may be indicative of one or more machine-identifiable and/or user-identifiable features indicated within an electronic map corresponding to all or part of environment 102. Here, for example, an estimated location of a mobile device 102 may be indicative of a particular mapped grid point, a particular identifiable mapped feature/location, etc. Of course these are just a few examples and claimed subject matter is not intended to be limited necessarily to these examples.

At example block 204, a measure of quality of a geometric distribution of a plurality of terrestrial-based transmitting devices capable of transmitting wireless signals to the mobile device at the estimated location may be determined. At example block 206, an uncertainty may be assigned to the estimated location based, at least in part, on the quality of the geometric distribution. In certain instances, an estimated position as obtained at block 202 may have been obtained using various different inputs/techniques, however, at example block 206 the uncertainty corresponding to such estimated location may be based, at least in part, on a measure of quality of a geometric distribution of a plurality of terrestrial-based transmitting devices.

At example block 208, an adapted transmission setting for at least one of the plurality of transmitting devices may be determined, e.g., in response to the uncertainty being less than a threshold uncertainty. At example block 210, a (feedback) message may be directly or indirectly transmitted to an applicable transmitting device, wherein the message may be indicative of the adapted transmission setting. In certain instances, the adapted transmission setting may represent an operative directive, which if implemented by the transmitting device, may affect an accuracy of a subsequently estimated location of the mobile device, and/or a subsequently characterized uncertainty corresponding to the subsequently estimated location. Here, for example, a subsequently estimated location of the mobile device may be determined, based at least in part, on one or more wireless signals received by the mobile device from one or more terrestrial-based transmitting devices.

Figure 2B:
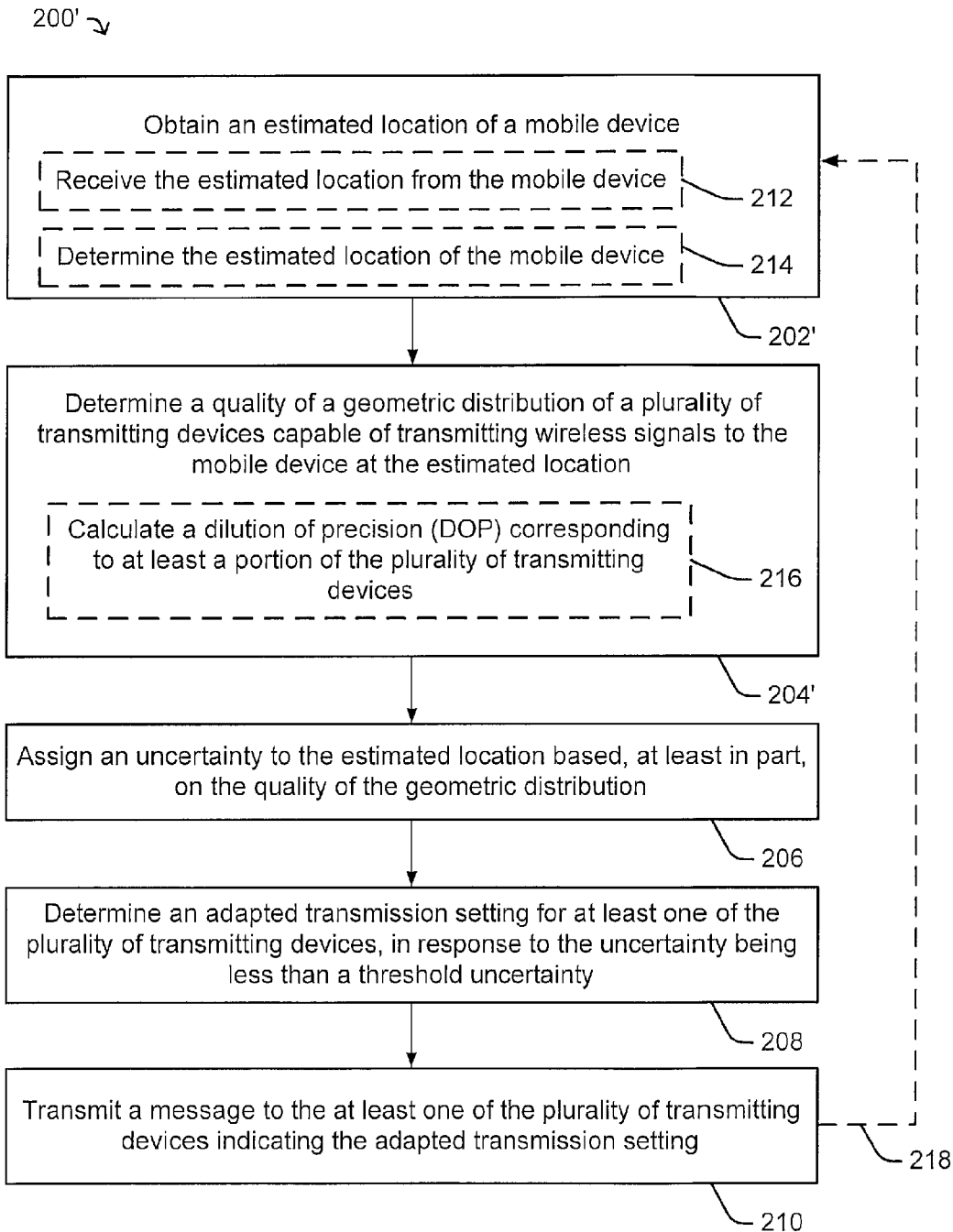

Attention is drawn next to FIG. 2B, which is a flow diagram illustrating an example process 200' that may be implemented in one or more electronic devices to determine a quality of a geometric distribution of transmitting devices capable of transmitting wireless signals to a mobile device at an estimated location, assign an uncertainty to the estimated location, determine an adapted transmission setting for at least one of the transmitting devices, and transmit a message to the transmitting device indicating the adapted transmission setting.

Example process 200' comprises expanded example blocks 202' and 204', and example blocks 206, 208 and 210 as previously described and illustrated in FIG. 2A. Here, example block 202', in which an estimated location of a mobile device may be obtained, may further comprise example block 212 in which the estimated location may be received from the mobile device. For example, at block 212, a report transmitted by mobile device 102 may be obtained. Here, for example, such a report may be indicative of an estimated location of mobile device 104, e.g., as determined at least in part, by mobile device 104. Hence, in certain instances, obtaining an estimated location of mobile device 104 may simply comprise receiving estimated location from mobile device 104. In certain instances, an estimated location of mobile device 104 as obtained via a report may be further processed in some manner to convert such information to a particular coordinate system for subsequent use, etc.

In certain example implementations, a report may be indicative of one or more measured parameters for one or more wireless signals as received by the mobile device from one or more of the terrestrial-based transmitting devices (e.g., represented by APs 108-1 through 108-*n*, in FIG. 1). By way of example, a measured parameter may be indicative of a measured RSSI, a measured RTT, and/or the like. Further, a measured parameter may be indicative of the corresponding transmitting device, e.g., the transmitting device's Mac address, and/or other like identifier. Accordingly, at example block 214, an estimated location of mobile device 104 may be determined, at least in part, e.g., by computing device 112 and/or apparatus 114, using one or more measured parameters obtained via a report from mobile device 104 and/or possibly other information corresponding to mobile device for (e.g., measured signal parameters obtained by one or more electronic devices from signals transmitted by mobile device 104, etc.).

Example block 204', in which a quality of a geometric distribution may be determined, may further comprise example block 216 in which a dilution of precision (DOP) corresponding to at least a portion of the transmitting devices may be calculated.

As further illustrated, example process 200' may be configured to provide an iterative capability which may be implemented to adapt various electronic devices in arrangement 100 to support certain positioning capabilities. Hence, for example, following the transmission of at least one (feedback) message (e.g., indicating an operative directive to at least one electronic device) at example block 210, process 200' may return as illustrated by dashed line 218 back to example block 202 wherein a subsequent estimated location of a mobile device may be obtained. Although not shown, in FIG. 2A, it should be understood that process 200 may also include an iterative capability which may be implemented in the same or similar manner.

Figure 3A:
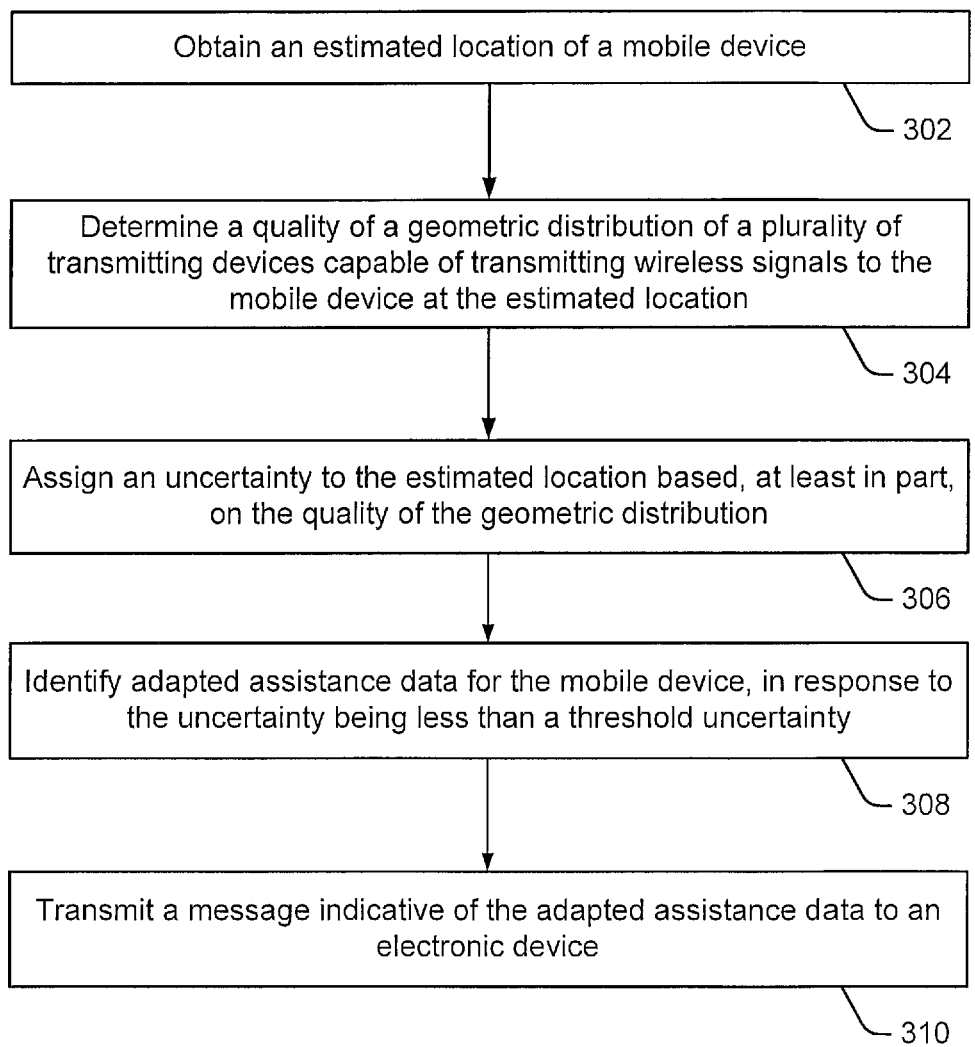
FIG. 3A and FIG. 3B are flow diagrams illustrating some example processes that may be implemented in one or more electronic devices to determine a quality of a geometric distribution of transmitting devices capable of transmitting wireless signals to a mobile device at an estimated location, assign an uncertainty to the estimated location, identify adapted assistance data for the mobile device, and transmit a message indicative of the adapted assistance data to an electronic device, in accordance with certain example implementations.

Attention is drawn next to FIG. 3A, which is a flow diagram illustrating an example process 300 that may be implemented in one or more electronic devices to characterize an estimated location of a mobile device, and attempt to affect an accuracy of, and/or an uncertainty corresponding to, a subsequent estimated location of the mobile device. By way of example, process 300 may be implemented in whole or in part by mobile device 104 and/or apparatus 106 provisioned therein. By way of example, process 200 may be implemented in whole or in part by computing device 112 and/or apparatus 114 provisioned therein.

At example block 302, an estimated location of mobile device 104 (FIG. 1) may be obtained. In certain example implementations, example block 302 may be the same or similar to example block 202 (FIG. 2A).

At example block 304, a measure of quality of a geometric distribution of a plurality of terrestrial-based transmitting devices capable of transmitting wireless signals to the mobile device at the estimated location may be determined. In certain example implementations, example block 304 may be the same or similar to example block 204 (FIG. 2A).

At example block 306, an uncertainty may be assigned to the estimated location based, at least in part, on the quality of the geometric distribution. In certain example implementations, example block 306 may be the same or similar to example block 206 (FIG. 2A).

At example block 308, adapted assistance data for the mobile device may be identified, e.g., in response to the uncertainty being less than a threshold uncertainty. For example, in certain instances, an identifier and/or the like corresponding to adapted assistance data (e.g., which may already exist or may be generated) may be identified at example block 308. In certain implementations, block 308 may further comprise generating all or part of such adapted assistance data.

At example block 310, a (feedback) message may be directly or indirectly transmitted to an electronic device, wherein the message may be indicative of the adapted assistance data. Here, for example, in certain instances the electronic device may comprise an electronic device capable of transmitting all or part of the adapted assistance data to the mobile device. In certain implementations, the electronic device may comprise the mobile device, and the message may comprise all or part of the adapted assistance data.

The adapted assistance data may, for example, represent an operative directive, which if taken into account (e.g., used) by the mobile device, may affect an accuracy of a subsequently estimated location of the mobile device, and/or a subsequently characterized uncertainty corresponding to the subsequently estimated location. Here, for example, a subsequently estimated location of the mobile device may be determined, based at least in part, on one or more wireless signals received by the mobile device from one or more terrestrial-based transmitting devices.

Figure 3B:
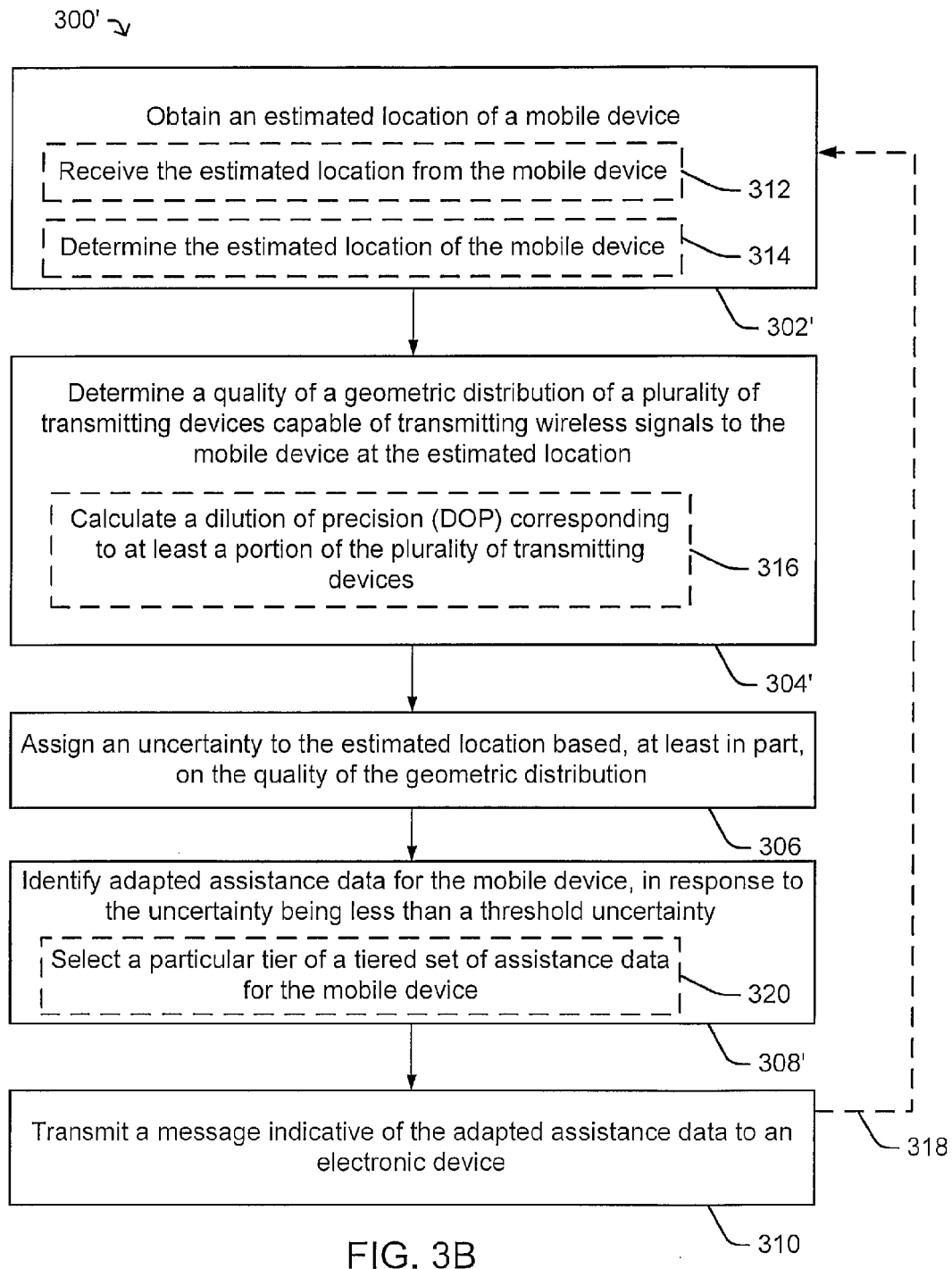

Attention is drawn next to FIG. 3B, which is a flow diagram illustrating an example process 300' that may be implemented in one or more electronic devices to determine a quality of a geometric distribution of transmitting devices capable of transmitting wireless signals to a mobile device at an estimated location, assign an uncertainty to the estimated location, identify adapted assistance data for the mobile device, and transmit a message indicative of the adapted assistance data to an electronic device.

Example process 300' comprises expanded example blocks 302', 304', and 308', and example blocks 306 and 310 as previously described and illustrated in FIG. 3A. Here, example block 302', in which an estimated location of a mobile device may be obtained, may further comprise example block 312 in which the estimated location may be received from the mobile device. In certain example implementations, example block 312 may be the same or similar to example block 212 (FIG. 2B). At example block 314, an estimated location of mobile device 104 may be determined, at least in part, e.g., by computing device 112 and/or apparatus 114, using one or more measured parameters obtained via a report from mobile device 104 and/or possibly other information corresponding to mobile device for (e.g., measured signal parameters obtained by one or more electronic devices from signals transmitted by mobile device 104, etc.). In certain example implementations, example block 314 may be the same or similar to example block 214 (FIG. 2B).

Example block 304', in which a quality of a geometric distribution may be determined, may further comprise example block 316 in which a dilution of precision (DOP) corresponding to at least a portion of the transmitting devices may be calculated. In certain example implementations, example block 316 may be the same or similar to example block 216 (FIG. 2B).

Example block 308', in which adapted assistance data may be identified, may further comprise example block 320 in which one or more particular tiers of a tiered set of assistance data may be selected. For example, a more detailed, accurate, or otherwise (relatively) different tier of assistance data may be selected which may lead to an improvement in the accuracy of a subsequently estimated location of the mobile device.

As further illustrated, example process 300' may be configured to provide an iterative capability which may be implemented to adapt various electronic devices in arrangement 100 to support certain positioning capabilities. Hence, for example, following the transmission of at least one (feedback) message (e.g., indicating an operative directive to at least one electronic device) at example block 310, process 300' may return as illustrated by dashed line 318 back to example block 302 wherein a subsequent estimated location of a mobile device may be obtained. Although not shown, in FIG. 3A, it should be understood that process 300 may also include an iterative capability which may be implemented in the same or similar manner.

Figure 4:
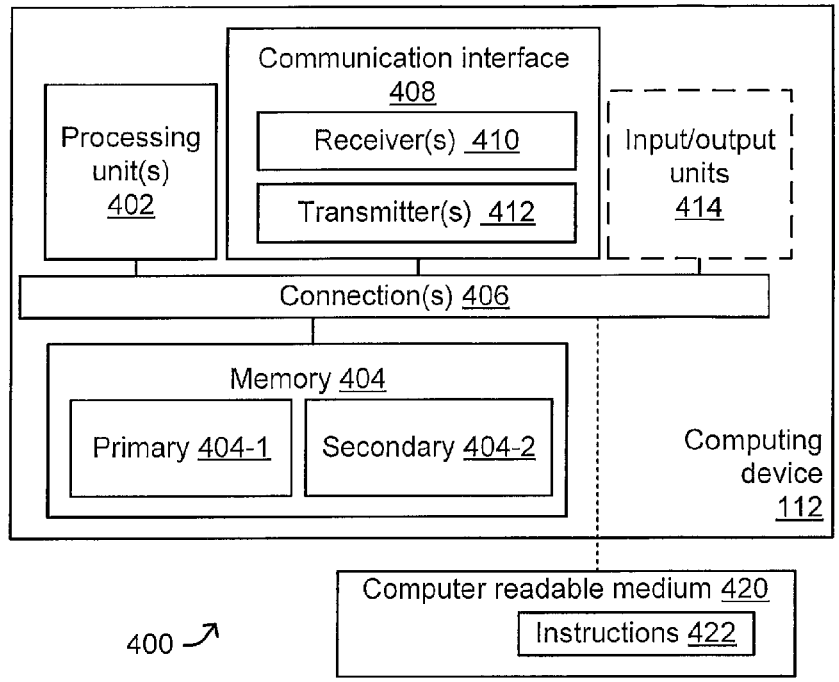
FIG. 4 is a schematic diagram illustrating certain features of an example special purpose computing platform that may be provisioned within a network-based computing device to characterize an estimated location of a mobile device, and attempt to affect an accuracy of, and/or an uncertainty corresponding to, a subsequent estimated location of the mobile device, in accordance with certain example implementations.

Reference is made next to FIG. 4, which is a schematic block diagram illustrating certain features of an example special purpose computing platform 400 which may be provided as part of computing device 112, and/or apparatus 114 provisioned therein.

FIG. 4 is a schematic diagram illustrating certain features of an example special purpose computing platform 400 that may be provisioned within a network-based computing device 112 and/or apparatus 114 (FIG. 1) to characterize an estimated location of a mobile device 104, and attempt to affect an accuracy of, and/or an uncertainty corresponding to, a subsequent estimated location of mobile device 104, in accordance with certain example implementations.

As illustrated special purpose computing platform 400 may comprise one or more processing units 402 (e.g., to perform data processing in accordance with certain techniques provided herein) coupled to memory 404 via one or more connections 406 (e.g., one or more electrical conductors, one or more electrically conductive paths, one or more buses, one or more fiber-optic paths, one or more circuits, one or more buffers, one or more transmitters, one or more receivers, etc.). Processing unit(s) 402 may, for example, be implemented in hardware or a combination of hardware and software. Processing unit(s) 402 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof.

Memory 404 may be representative of any data storage mechanism. Memory 404 may include, for example, a primary memory 404-1 and/or a secondary memory 404-2. Primary memory 404-1 may comprise, for example, a random access memory, read only memory, etc. While illustrated in this example as being separate from the processing units, it should be understood that all or part of a primary memory may be provided within or otherwise co-located and coupled with processing unit 402 or other like circuitry within computing device 112. Secondary memory 404-2 may comprise, for example, the same or similar type of memory as primary memory and/or one or more data storage devices or systems, such as, for example, a disk drive, an optical disc drive, a tape drive, a solid motion state memory drive, etc.

In certain implementations, secondary memory may be operatively receptive of, or otherwise configurable to couple to, a non-transitory computer readable medium 420. Memory 404 and/or non-transitory computer readable medium 420 may comprise instructions 422 for use in performing data processing, e.g., in accordance with the applicable techniques as provided herein.

Special purpose computing platform 400 may, for example, further comprise a communication interface 408. Communication interface 408 may, for example, comprise one or more wired and/or wireless network interface units, radios, modems, etc., represented here by one or more receivers 410 and one or more transmitters 412. It should be understood that in certain implementations, communication interface 408 may comprise one or more transceivers, and/or the like. Further, it should be understood that although not shown, communication interface 408 may comprise one or more antennas and/or other circuitry as may be applicable given the communication interface capability.

In accordance with certain example implementations, communication interface 408 may, for example, be enabled for use with various wired communication networks, e.g., such as telephone system, a local area network, a wide area network, a personal area network, an intranet, the Internet, etc.

In accordance with certain example implementations communication interface 408 and/or 508 (see FIG. 5) may, for example, be enabled for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMBP capability), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMAX, Ultra Mobile Broadband (UMB), and/or the like. Additionally, communication interface(s) 408 may further provide for infrared-based communications with one or more other devices. A WLAN may, for example, comprise an IEEE 802.11x network, and a WPAN may comprise a Bluetooth network, an IEEE 802.15x, for example. Wireless communication implementations described herein may also be used in connection with any combination of WWAN, WLAN or WPAN.

Computing device 112 may, for example, further comprise one or more input and/or output units 414. Input and/or output units 414 may represent one or more devices or other like mechanisms that may be used to obtain inputs from and/or provide outputs to one or more other devices and/or a user. Thus, for example, input and/or output units 414 may comprise various buttons, switches, a touch pad, a trackball, a joystick, a touch screen, a keyboard, and/or the like, which may be used to receive one or more user inputs. In certain instances, input and/or output units 414 may comprise various devices that may be used in producing a visual output, an audible output, and/or a tactile output for a user. For example, input and/or output units 414 may be used to present a video display, graphical user interface, etc., on a display mechanism.

Figure 5:
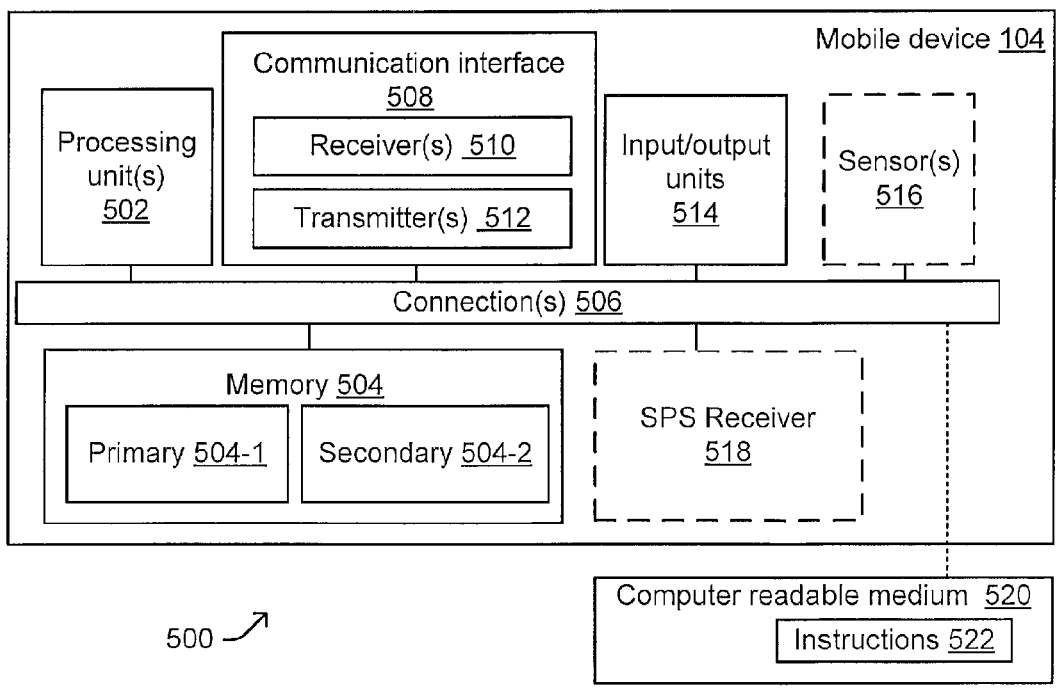
FIG. 5 is a schematic diagram illustrating certain features of an example special purpose computing platform that may be provisioned within a mobile device to characterize an estimated location of a mobile device, and attempt to affect an accuracy of, and/or an uncertainty corresponding to, a subsequent estimated location of the mobile device, in accordance with certain example implementations.

Attention is now drawn to FIG. 5, which is a schematic diagram illustrating certain features of an example special purpose computing platform 500 that may be provisioned within a mobile device 104 and/or apparatus 106 to characterize an estimated location of mobile device 104, and attempt to affect an accuracy of, and/or an uncertainty corresponding to, a subsequent estimated location of mobile device 104, in accordance with certain example implementation.

As illustrated special computing platform 500 may comprise one or more processing units 502 (e.g., to perform data processing in accordance with certain techniques provided herein) coupled to memory 504 via one or more connections 506 (e.g., one or more electrical conductors, one or more electrically conductive paths, one or more buses, one or more fiber-optic paths, one or more circuits, one or more buffers, one or more transmitters, one or more receivers, etc.). Processing unit(s) 502 may, for example, be implemented in hardware or a combination of hardware and software. Processing unit(s) 502 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof. Processing unit(s) 502 may, for example, perform computer implementable instructions corresponding to one or more applications(s) 152 (FIG. 1).

Memory 504 may be representative of any data storage mechanism. Memory 504 may include, for example, a primary memory 504-1 and/or a secondary memory 504-2. Primary memory 504-1 may comprise, for example, a random access memory, read only memory, etc. While illustrated in this example as being separate from the processing units, it should be understood that all or part of a primary memory may be provided within or otherwise co-located and coupled with processing unit 502 or other like circuitry within mobile device 104. Secondary memory 504-2 may comprise, for example, the same or similar type of memory as primary memory and/or one or more data storage devices or systems, such as, for example, a disk drive, an optical disc drive, a tape drive, a solid motion state memory drive, etc.

In certain implementations, secondary memory may be operatively receptive of, or otherwise configurable to couple to, a non-transitory computer readable medium 520. Memory 504 and/or non-transitory computer readable medium 520 may comprise instructions 522 for use in performing data processing, e.g., in accordance with the applicable techniques as provided herein.

Special purpose computing platform 500 may, for example, further comprise one or more communication interface 508. Communication interface 508 may, for example, comprise one or more wired and/or wireless network interface units, radios, modems, etc., represented here by one or more receivers 510 and one or more transmitters 512. It should be understood that in certain implementations, communication interface 508 may comprise one or more transceivers, and/or the like. Further, it should be understood that although not shown, communication interface 508 may comprise one or more antennas and/or other circuitry as may be applicable given the communication interface capability.

In accordance with certain example implementations, communication interface 508 may, for example, be enabled for use with various wired communication networks, e.g., such as telephone system, a local area network, a wide area network, a personal area network, an intranet, the Internet, etc.

Mobile device 104 may, for example, further comprise one or more input and/or output units 514. Input and/or output units 514 may represent one or more devices or other like mechanisms that may be used to obtain inputs from and/or provide outputs to one or more other devices and/or a user. Thus, for example, input and/or output units 514 may comprise various buttons, switches, a touch pad, a trackball, a joystick, a touch screen, a keyboard, a microphone, a camera, and/or the like, which may be used to receive one or more user inputs. In certain instances, input and/or output units 514 may comprise various devices that may be used in producing a visual output, an audible output, and/or a tactile output for a user. For example, input and/or output units 514 may be used to present a video display, graphical user interface, positioning and/or navigation related information, visual representations of electronic map, routing directions, etc., via a display mechanism and/or audio mechanism.

Mobile device 104 may, for example, comprise one or more sensors 516. For example, sensor(s) 516 may represent one or more environmental sensors, such as, e.g., a magnetometer or compass, a barometer or altimeter, etc., and which may be useful for positioning. For example, sensor(s) 516 may represent one or more inertial sensors, which may be useful in detecting certain movements of mobile device 104. Thus for example, sensor(s) 516 may comprise one or more accelerometers, one or one or more gyroscopes. Further, in certain instances sensor(s) 516 may comprise and/or take the form of one or more input devices such as a microphone, a camera, a light sensor, etc.

SPS receiver 518 may be capable of acquiring and acquiring wireless signals 134 via one or more antennas (not shown). SPS receiver 518 may also process, in whole or in part, acquired wireless signals 134 for estimating a position and/or a motion of mobile device 104. In certain instances, SPS receiver 518 may comprise one or more processing unit(s) (not shown), e.g., one or more general purpose processors, one or more digital signal processors DSP(s), one or more specialized processors that may also be utilized to process acquired SPS signals, in whole or in part, and/or calculate an estimated location of mobile device 104. In certain implementations, all or part of such processing of acquired SPS signals may be performed by other processing capabilities in mobile device 104, e.g., processing unit(s) 502, memory 504, etc., in conjunction with SPS receiver 518. Storage of SPS or other signals for use in performing positioning operations may be performed in memory 504 or registers (not shown).

In certain instances, sensor(s) 516 may generate analog or digital signals that may be stored in memory 504 and processed by DPS(s) (not shown) or processing unit(s) 502 in support of one or more applications such as, for example, applications directed to positioning or navigation operations based, at least in part, on one or more positioning functions.

Processing unit(s) 502 may comprise a dedicated modem processor or the like that may be capable of performing baseband processing of signals acquired and downconverted at receiver(s) 510 of communication interface 508 or SPS receiver 509. Similarly, a modem processor or the like may perform baseband processing of signals to be upconverted for transmission by (wireless) transmitter(s) 512. In alternative implementations, instead of having a dedicated modem processor, baseband processing may be performed by a general purpose processor or DSP (e.g., general purpose and/or application processor). It should be understood, however, that these are merely examples of structures that may perform baseband processing, and that claimed subject matter is not limited in this respect. Moreover, it should be understood that the example techniques provided herein may be adapted for a variety of different electronic devices, mobile devices, transmitting devices, environments, position fix modes, etc.

The techniques described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically motion stated otherwise, as apparent from the following discussion, it is appreciated that throughout this specification discussions utilizing terms such as "processing", "computing", "calculating", "determining", "generating", "obtaining", "modifying", "selecting", "identifying", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method comprising, with a computing platform:
obtaining an estimated location of a mobile device;
determining a quality of a geometric distribution of a plurality of transmitting devices capable of transmitting wireless signals to said mobile device at said estimated location;
assigning an uncertainty to said estimated location based, at least in part, on said quality of said geometric distribution;
in response to said uncertainty being less than a threshold uncertainty, determining an adapted transmission setting for at least one of said plurality of transmitting devices; and
transmitting a message to said at least one of said plurality of transmitting devices indicating said adapted transmission setting.

2. The method as recited in claim 1, and wherein said adapted transmission setting is indicative of a transmit power setting.

3. The method as recited in claim 1, and wherein said adapted transmission setting is indicative of a frequency setting, and/or a channel setting.

4. The method as recited in claim 1, and wherein said adapted transmission setting is indicative of a transmission mode setting.

5. The method as recited in claim 1, and wherein said computing platform is not provisioned within said mobile device, and wherein obtaining said estimated location of said mobile device comprises:
receiving said estimated location from said mobile device.

6. The method as recited in claim 1, and wherein said computing platform is not provisioned within said mobile device, and wherein obtaining said estimated location of said mobile device comprises:
receiving, from said mobile device, a measured parameter for a wireless signal received by said mobile device from one or more of said plurality of transmitting devices; and
determining said estimated location of said mobile device based, at least in part, on said measured parameter.

7. The method as recited in claim 1, and wherein said computing platform is provisioned within said mobile device, and further comprising, with said computing platform:
determining said estimated location of said mobile device based, at least in part, on a measured parameter for a wireless signal received from one or more of said plurality of transmitting devices.

8. The method as recited in claim 1, and wherein said geometric distribution of said plurality of transmitting devices is based, at least in part, on a calculated dilution of precision (DOP) corresponding to at least a portion of said plurality of transmitting devices.

9. The method as recited in claim 1, and wherein at least one of said plurality of transmitting devices comprises another mobile device.

10. The method as recited in claim 1, and wherein at least one of said plurality of transmitting devices comprises an access point device.

11. An apparatus comprising:
means for obtaining an estimated location of a mobile device;
means for determining a quality of a geometric distribution of a plurality of transmitting devices capable of transmitting wireless signals to said mobile device at said estimated location;
means for assigning an uncertainty to said estimated location based, at least in part, on said quality of said geometric distribution;
means for determining an adapted transmission setting for at least one of said plurality of transmitting devices, in response to said uncertainty being less than a threshold uncertainty; and
means for transmitting a message to said at least one of said plurality of transmitting devices indicating said adapted transmission setting.

12. The apparatus as recited in claim 11, and wherein said adapted transmission setting is indicative of a transmit power setting.

13. The apparatus as recited in claim 11, and wherein said adapted transmission setting is indicative of a frequency setting, and/or a channel setting.

14. The apparatus as recited in claim 11, and wherein said adapted transmission setting is indicative of a transmission mode setting.

15. The apparatus as recited in claim 11, and wherein said apparatus is not provisioned within said mobile device, and further comprising:
means for receiving said estimated location from said mobile device.

16. The apparatus as recited in claim 11, and wherein said apparatus is not provisioned within said mobile device, and further comprising:

means for receiving, from said mobile device, a measured parameter for a wireless signal received by said mobile device from one or more of said plurality of transmitting devices; and means for determining said estimated location of said mobile device based, at least in part, on said measured parameter.

17. The apparatus as recited in claim 11, and wherein said apparatus is provisioned within said mobile device, and further comprising:

means for determining said estimated location of said mobile device based, at least in part, on a measured parameter for a wireless signal received from one or more of said plurality of transmitting devices.

18. The apparatus as recited in claim 11, and wherein said geometric distribution of said plurality of transmitting devices is based, at least in part, on a calculated dilution of precision (DOP) corresponding to at least a portion of said plurality of transmitting devices.

19. The apparatus as recited in claim 11, and wherein at least one of said plurality of transmitting devices comprises another mobile device.

20. The apparatus as recited in claim 11, and wherein at least one of said plurality of transmitting devices comprises an access point device.

21. A device comprising:
communication interface; and
a processing unit coupled to said communication interface and configured to:
 obtain an estimated location of a mobile device;
 determine a quality of a geometric distribution of a plurality of transmitting devices capable of transmitting wireless signals to said mobile device at said estimated location;
 assign an uncertainty to said estimated location based, at least in part, on said quality of said geometric distribution;
 determine an adapted transmission setting for at least one of said plurality of transmitting devices, in response to said uncertainty being less than a threshold uncertainty; and
 initiate transmission of a message, via said communication interface, to said at least one of said plurality of transmitting devices indicating said adapted transmission setting.

22. The device as recited in claim 21, and wherein said adapted transmission setting is indicative of a transmit power setting.

23. The device as recited in claim 21, and wherein said adapted transmission setting is indicative of a frequency setting, and/or a channel setting.

24. The device as recited in claim 21, and wherein said adapted transmission setting is indicative of a transmission mode setting.

25. The device as recited in claim 21, and wherein said device does not comprise said mobile device, and said processing unit is further configured to:
 receive said estimated location from said mobile device via said communication interface.

26. The device as recited in claim 21, and wherein said device does not comprise said mobile device, and said processing unit is further configured to:
 obtain, from said mobile device via said communication interface, a measured parameter for a wireless signal received by said mobile device from one or more of said plurality of transmitting devices; and
 determine said estimated location of said mobile device based, at least in part, on said measured parameter.

27. The device as recited in claim 21, and wherein said device comprises said mobile device, and said processing unit is further configured to:
 determine said estimated location of said mobile device based, at least in part, on a measured parameter for a wireless signal received from one or more of said plurality of transmitting devices via said communication interface.

28. The device as recited in claim 21, and wherein said geometric distribution of said plurality of transmitting devices is based, at least in part, on a calculated dilution of precision (DOP) corresponding to at least a portion of said plurality of transmitting devices.

29. The device as recited in claim 21, and wherein at least one of said plurality of transmitting devices comprises another mobile device.

30. The device as recited in claim 21, and wherein at least one of said plurality of transmitting devices comprises an access point device.

31. An article comprising:
a non-transitory computer readable medium having stored therein computer implementable instructions executable by a processing unit of a computing platform to:
 obtain an estimated location of a mobile device;
 determine a quality of a geometric distribution of a plurality of transmitting devices capable of transmitting wireless signals to said mobile device at said estimated location;
 assign an uncertainty to said estimated location based, at least in part, on said quality of said geometric distribution;
 determine an adapted transmission setting for at least one of said plurality of transmitting devices, in response to said uncertainty being less than a threshold uncertainty; and
 initiate transmission of a message to said at least one of said plurality of transmitting devices indicating said adapted transmission setting.

32. The article as recited in claim 31, and wherein said adapted transmission setting is indicative of a transmit power setting.

33. The article as recited in claim 31, and wherein said adapted transmission setting is indicative of a frequency setting, and/or a channel setting.

34. The article as recited in claim 31, and wherein said adapted transmission setting is indicative of a transmission mode setting.

35. The article as recited in claim 31, and wherein said computing platform is not provisioned in said mobile device, and said computer implementable instructions are further executable by said processing unit to:
 obtain said estimated location from said mobile device.

36. The article as recited in claim 31, and wherein said computing platform is not provisioned in said mobile device, and said computer implementable instructions are further executable by said processing unit to:
 obtain, from said mobile device, a measured parameter for a wireless signal received by said mobile device from one or more of said plurality of transmitting devices; and
 determine said estimated location of said mobile device based, at least in part, on said measured parameter.

37. The article as recited in claim 31, and wherein said computing platform is provisioned in said mobile device, and said computer implementable instructions are further executable by said processing unit to:

determine said estimated location of said mobile device based, at least in part, on a measured parameter for a wireless signal received from one or more of said plurality of transmitting devices.

38. The article as recited in claim 31, and wherein said geometric distribution of said plurality of transmitting devices is based, at least in part, on a calculated dilution of precision (DOP) corresponding to at least a portion of said plurality of transmitting devices.

39. The article as recited in claim 31, and wherein at least one of said plurality of transmitting devices comprises another mobile device.

40. The article as recited in claim 31, and wherein at least one of said plurality of transmitting devices comprises an access point device.

41. A method comprising, with a computing platform:
obtaining an estimated location of a mobile device;
determining a quality of a geometric distribution of a plurality of transmitting devices capable of transmitting wireless signals to said mobile device at said estimated location;
assigning an uncertainty to said estimated location based, at least in part, on said quality of said geometric distribution;
identifying adapted assistance data for said mobile device, in response to said uncertainty being less than a threshold uncertainty; and
transmitting a message indicative of said adapted assistance data to an electronic device.

42. The method as recited in claim 41, and wherein said electronic device comprises said mobile device and said message comprises said adapted assistance data.

43. The method as recited in claim 41, and wherein said message is indicative of a request to said electronic device to transmit said adapted assistance data to said mobile device.

44. The method as recited in claim 41, and wherein said adapted assistance data comprises a portion of a tiered set of assistance data for said mobile device.

45. The method as recited in claim 44, and wherein identifying said adapted assistance data for said mobile device further comprises:
selecting a particular tier of said tiered set of assistance data for said mobile device.

46. The method as recited in claim 41, and wherein said computing device is not provisioned within said mobile device, and wherein obtaining said estimated location of said mobile device further comprises:
receiving said estimated location from said mobile device.

47. The method as recited in claim 41, and wherein obtaining said estimated location of said mobile device further comprises:
determining said estimated location of said mobile device based, at least in part, on a measured parameter for a wireless signal received by said mobile device from one or more of said plurality of transmitting devices.

48. The method as recited in claim 41, and wherein said geometric distribution of said plurality of transmitting devices is based, at least in part, on a calculated dilution of precision (DOP) corresponding to at least a portion of said plurality of transmitting devices.

49. The method as recited in claim 41, and wherein at least one of said plurality of transmitting devices comprises another mobile device.

50. The method as recited in claim 41, and wherein at least one of said plurality of transmitting devices comprises an access point device.

51. An apparatus comprising:
means for obtaining an estimated location of a mobile device;
means for determining a quality of a geometric distribution of a plurality of transmitting devices capable of transmitting wireless signals to said mobile device at said estimated location;
means for assigning an uncertainty to said estimated location based, at least in part, on said quality of said geometric distribution;
means for identifying adapted assistance data for said mobile device, in response to said uncertainty being less than a threshold uncertainty; and
means for transmitting a message indicative of said adapted assistance data to an electronic device.

52. The apparatus as recited in claim 51, and wherein said electronic device comprises said mobile device and said message comprises said adapted assistance data.

53. The apparatus as recited in claim 51, and wherein said message is indicative of a request to said electronic device to transmit said adapted assistance data to said mobile device.

54. The apparatus as recited in claim 51, and wherein said adapted assistance data comprises a portion of a tiered set of assistance data for said mobile device.

55. The apparatus as recited in claim 54, and further comprising:
means for selecting a particular tier of said tiered set of assistance data for said mobile device.

56. The apparatus as recited in claim 51, and wherein said apparatus is not provisioned within said mobile device, and further comprising:
means for receiving said estimated location from said mobile device.

57. The apparatus as recited in claim 51, and further comprising:
means for determining said estimated location of said mobile device based, at least in part, on a measured parameter for a wireless signal received by said mobile device from one or more of said plurality of transmitting devices.

58. The apparatus as recited in claim 51, and wherein said geometric distribution of said plurality of transmitting devices is based, at least in part, on a calculated dilution of precision (DOP) corresponding to at least a portion of said plurality of transmitting devices.

59. The apparatus as recited in claim 51, and wherein at least one of said plurality of transmitting devices comprises another mobile device.

60. The apparatus as recited in claim 51, and wherein at least one of said plurality of transmitting devices comprises an access point device.

61. A device comprising:
communication interface; and
a processing unit coupled to said communication interface and configured to:
obtain an estimated location of a mobile device;
determine a quality of a geometric distribution of a plurality of transmitting devices capable of transmitting wireless signals to said mobile device at said estimated location;
assign an uncertainty to said estimated location based, at least in part, on said quality of said geometric distribution;
identify adapted assistance data for said mobile device, in response to said uncertainty being less than a threshold uncertainty; and initiate transmission of a message indicative of said adapted assistance data to an electronic device via said communication interface.

62. The device as recited in claim 61, and wherein said electronic device comprises said mobile device and said message comprises said adapted assistance data.

63. The device as recited in claim 61, and wherein said message is indicative of a request to said electronic device to transmit said adapted assistance data to said mobile device.

64. The device as recited in claim 61, and wherein said adapted assistance data comprises a portion of a tiered set of assistance data for said mobile device.

65. The device as recited in claim 64, and wherein said processing unit is further configured to:
select a particular tier of said tiered set of assistance data for said mobile device.

66. The device as recited in claim 61, and wherein said computing device is not provisioned within said mobile device, and wherein said processing unit is further configured to:
receive said estimated location from said mobile device via said communication interface.

67. The device as recited in claim 61, and wherein said processing unit is further configured to:
determine said estimated location of said mobile device based, at least in part, on a measured parameter for a wireless signal received by said mobile device from one or more of said plurality of transmitting devices.

68. The device as recited in claim 61, and wherein said geometric distribution of said plurality of transmitting devices is based, at least in part, on a calculated dilution of precision (DOP) corresponding to at least a portion of said plurality of transmitting devices.

69. The device as recited in claim 61, and wherein at least one of said plurality of transmitting devices comprises another mobile device.

70. The device as recited in claim 61, and wherein at least one of said plurality of transmitting devices comprises an access point device.

71. An article comprising:
a non-transitory computer readable medium having stored therein computer implementable instructions executable by a processing unit of a computing platform to:
obtain an estimated location of a mobile device;
determine a quality of a geometric distribution of a plurality of transmitting devices capable of transmitting wireless signals to said mobile device at said estimated location;
assign an uncertainty to said estimated location based, at least in part, on said quality of said geometric distribution;
identify adapted assistance data for said mobile device, in response to said uncertainty being less than a threshold uncertainty; and
initiate transmission of a message indicative of said adapted assistance data to an electronic device.

72. The article as recited in claim 71, and wherein said electronic device comprises said mobile device and said message comprises said adapted assistance data.

73. The article as recited in claim 71, and wherein said message is indicative of a request to said electronic device to transmit said adapted assistance data to said mobile device.

74. The article as recited in claim 71, and wherein said adapted assistance data comprises a portion of a tiered set of assistance data for said mobile device.

75. The article as recited in claim 74, and wherein said computer implementable instructions are further executable by said processing unit to:
select a particular tier of said tiered set of assistance data for said mobile device.

76. The article as recited in claim 71, and wherein said computing device is not provisioned within said mobile device, and said computer implementable instructions are further executable by said processing unit to:
obtaining said estimated location from said mobile device.

77. The article as recited in claim 71, and wherein said computer implementable instructions are further executable by said processing unit to:
determine said estimated location of said mobile device based, at least in part, on a measured parameter for a wireless signal received by said mobile device from one or more of said plurality of transmitting devices.

78. The article as recited in claim 71, and wherein said geometric distribution of said plurality of transmitting devices is based, at least in part, on a calculated dilution of precision (DOP) corresponding to at least a portion of said plurality of transmitting devices.

79. The article as recited in claim 71, and wherein at least one of said plurality of transmitting devices comprises another mobile device.

80. The article as recited in claim 71, and wherein at least one of said plurality of transmitting devices comprises an access point device.

* * * * *